United States Patent
Coombs, Jr.

(10) Patent No.: US 6,458,434 B1
(45) Date of Patent: Oct. 1, 2002

(54) PEDESTAL MOUNTED TAXIDERMY MANNEQUIN AND MOLD FOR THE MANUFACTURING THEREOF

(75) Inventor: Clyde R Coombs, Jr., Loranger, LA (US)

(73) Assignee: Joe Coombs Classics, Inc., Loranger, LA (US)

( * ) Notice: Subject to any disclaimer, the term of this patent is extended or adjusted under 35 U.S.C. 154(b) by 0 days.

(21) Appl. No.: 08/839,528

(22) Filed: Apr. 14, 1997

(51) Int. Cl.$^7$ ............................................. B32B 17/00
(52) U.S. Cl. ...................... 428/16; 428/131; 428/542.4; 425/524; 434/295; 434/296; 446/313
(58) Field of Search .................. 428/16, 542.4, 428/131; 434/295, 296; 446/313; 156/61; 425/524, 577

(56) References Cited

U.S. PATENT DOCUMENTS

| | | | |
|---|---|---|---|
| 3,200,515 A | * 8/1965 | Daigre ........................ | 434/296 |
| 4,325,996 A | * 4/1982 | Krietemeier ................. | 428/16 |
| 4,432,919 A | * 2/1984 | Rinehart .................... | 428/16 X |
| 4,511,522 A | 4/1985 | Rinehart .................... | 264/46.4 |
| 4,738,809 A | * 4/1988 | Storch ....................... | 264/45.6 |
| 4,775,323 A | 10/1988 | Johnson ..................... | 428/16 X |
| 5,015,532 A | 5/1991 | Knight ...................... | 428/16 X |
| 5,478,136 A | * 12/1995 | Takeuchi et al. ............ | 297/391 |

\* cited by examiner

*Primary Examiner*—Timothy M. Speer
*Assistant Examiner*—Jennifer C. McNeil
(74) *Attorney, Agent, or Firm*—George R. McGuire; Hancock & Estabrook, LLP

(57) ABSTRACT

The present invention contemplates a pedestal mounted taxidermy mannequin, and a mold for manufacturing same. Once molded, the taxidermy mannequin includes an elongated, bored hole formed in a bottom portion thereof, and a rigid block positioned in supporting relation to the bored hole, thereby providing structural reinforcement and integrity to the bored hole. A rod is inserted into the bored hole to mount the mannequin to a pedestal. The mold for manufacturing the mannequin is an injection mold into which an elongated rod is inserted after the polyurethane has been injected therein. Just prior to hardening of the polyurethane, the end is removed, thereby leaving a bored hold in the mannequin form.

8 Claims, 2 Drawing Sheets

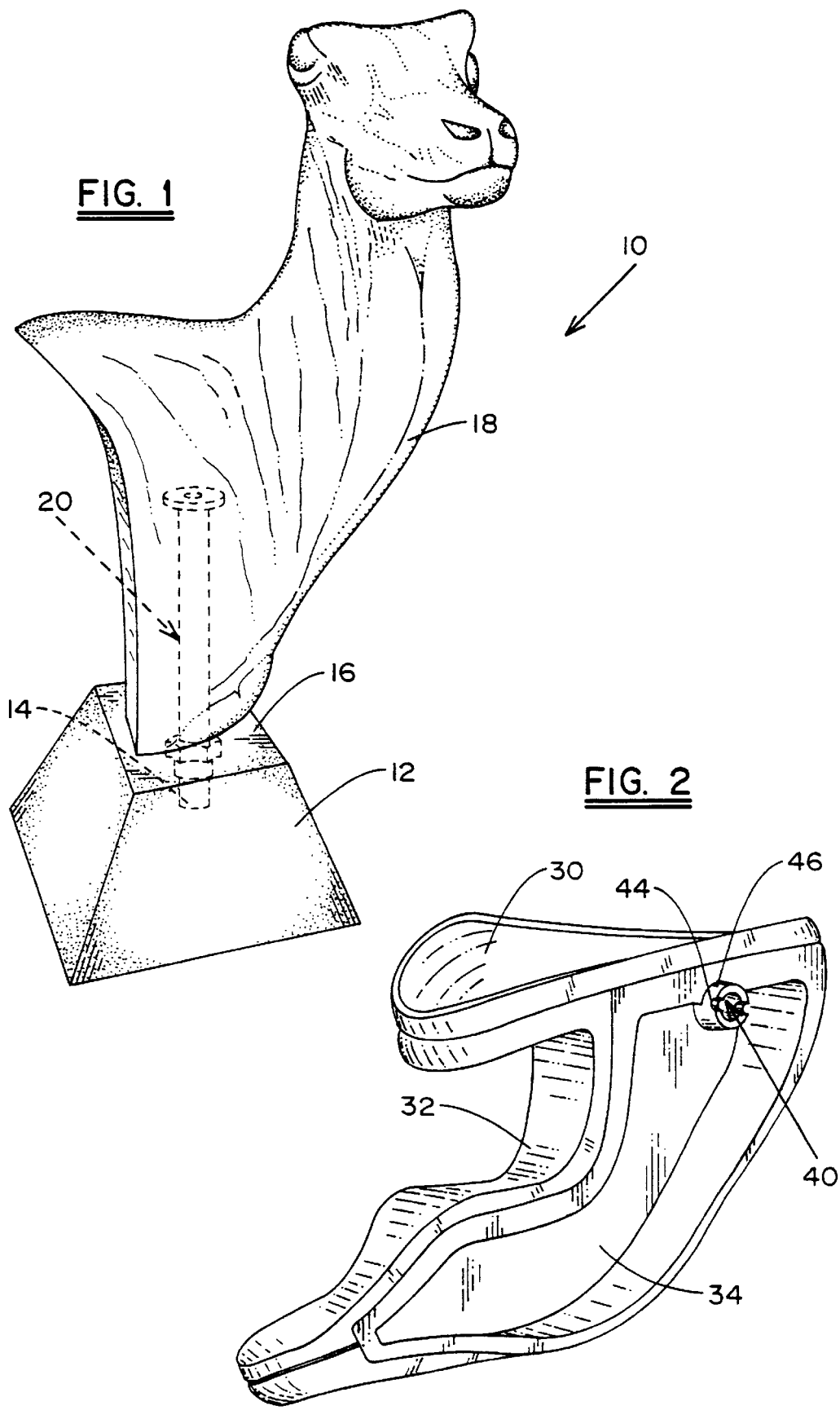

PEDESTAL MOUNTED TAXIDERMY MANNEQUIN AND MOLD FOR THE MANUFACTURING THEREOF

BACKGROUND OF THE INVENTION

The present invention generally relates to taxidermy mannequins, and more particularly to such mannequins to be mounted to a pedestal.

Overly simplified, in the art of taxidermy, a taxidermist will remove the skin and coat from the animal or fish to be mounted, and then stretch that skin and coat over a mannequin sculpted to have the anatomical appearance of the real animal or fish. In addition to the skin and coat, the taxidermist will further attach artificial eyes, noses, hooves, antler or horns to the mannequin to further replicate the animal's or fish's true appearance.

In addition to simply having the animal's or fish's appearance replicated, most hunters or fisherman also want their "trophy" to take on a preferred pose of the animal or fish. To accomplish this task, taxidermists will quite often mount the mannequin to a pedestal, rather than a traditional, wall plaque mounting due to the improved stability achieved using pedestals. Most often, a plate or bracket(s) are screwed to the lower surface(s) of a mannequin, which are, in turn, fastened to a pedestal in order to effect the mount. While such a connecting method sometimes proves effective, most often the material composition of the mannequin fails to be adequately supported by the screws, ultimately tearing apart or deforming in those areas having screws passed therethrough, thereby resulting in an unbalanced, unstable mount.

One manner of improving such premature degradation of mannequins has been accomplished by forming a bored hole into the base of a mannequin, and utilizing a pedestal having an elongated rod extending essentially, perpendicularly upwardly therefrom. To mount the mannequin to the pedestal simply requires that the mannequin be positioned such that the rod extends into the bore hole. While this mode of connection corrects the problems associated with screws tearing away at the mannequin, the weight of a mannequin causes the rod to bear against, and ultimately degrade the sidewalls and impale terminal end wall of the bored hole. Such stresses result in a mannequin becoming unstable on the pedestal and displaced from its intended position.

Accordingly, it is a present object and advantage of the present invention to provide a taxidermy mannequin that may be securely positioned on a standard pedestal.

It is another object and advantage of the present invention to provide a taxidermy mannequin that may be mounted for pivotal adjustment on a pedestal.

It is a further object and advantage of the present invention to provide a taxidermy mannequin that is more durable than the state of the art.

Other objects and advantages of the present invention will in part be obvious, and in part appear hereinafter.

SUMMARY OF THE INVENTION

In accordance with the foregoing objects and advantages, the present invention provides a taxidermy mannequin having an elongated, bored hole formed in a bottom portion thereof, and a rigid block molded into the mannequin in supporting relation to the bored hole, thereby providing structural reinforcement and integrity to the bored hole. The bored hole is sized such that the mannequin may be positioned with the bored hole receiving a standard sized rod extending upwardly from a conventional pedestal.

The mannequin is formed by molding light-weight polyurethane foam around the rigid block and into a desired form. Prior to the hardening of the polyurethane, a forming rod is inserted through a hole formed in the mold (which positions the bored hole at the bottom of the mannequin). Upon setting or hardening of the polyurethane, the forming rod is removed from the mannequin, leaving a bored hole in its place. In addition, a rigid disk is positioned at the terminal end of the bored hole in order to provide reinforcement thereto. After the polyurethane is fully set, the mold may be broken away or separated from the mannequin and reused as needed.

A conventional pedestal on which the mannequin is to be mounted includes an elongated rod extending upwardly therefrom. The mannequin is intended to be positioned on the pedestal with the elongated rod securely positioned within the elongated, bored hole. Due to the rigid block surrounding the sidewalls of the bored hole and the rigid disk positioned at the terminal end of the bored hole, the structural integrity of the mounted mannequin is sufficient to prevent the rod from degrading and/or impaling the mannequin, thereby maintaining stability thereof on the pedestal.

BRIEF DESCRIPTION OF THE DRAWINGS

The present invention will be more fully understood and appreciated upon reading the following Detailed Description in conjunction with the accompanying drawing figures, wherein:

FIG. 1 is a perspective view of a taxidermy mannequin mounted atop a pedestal made in accordance with the present invention;

FIG. 2 is a perspective view of a three-piece mold assembly used to manufacture the mannequin of FIG. 1;

DETAILED DESCRIPTION

Figure 3:
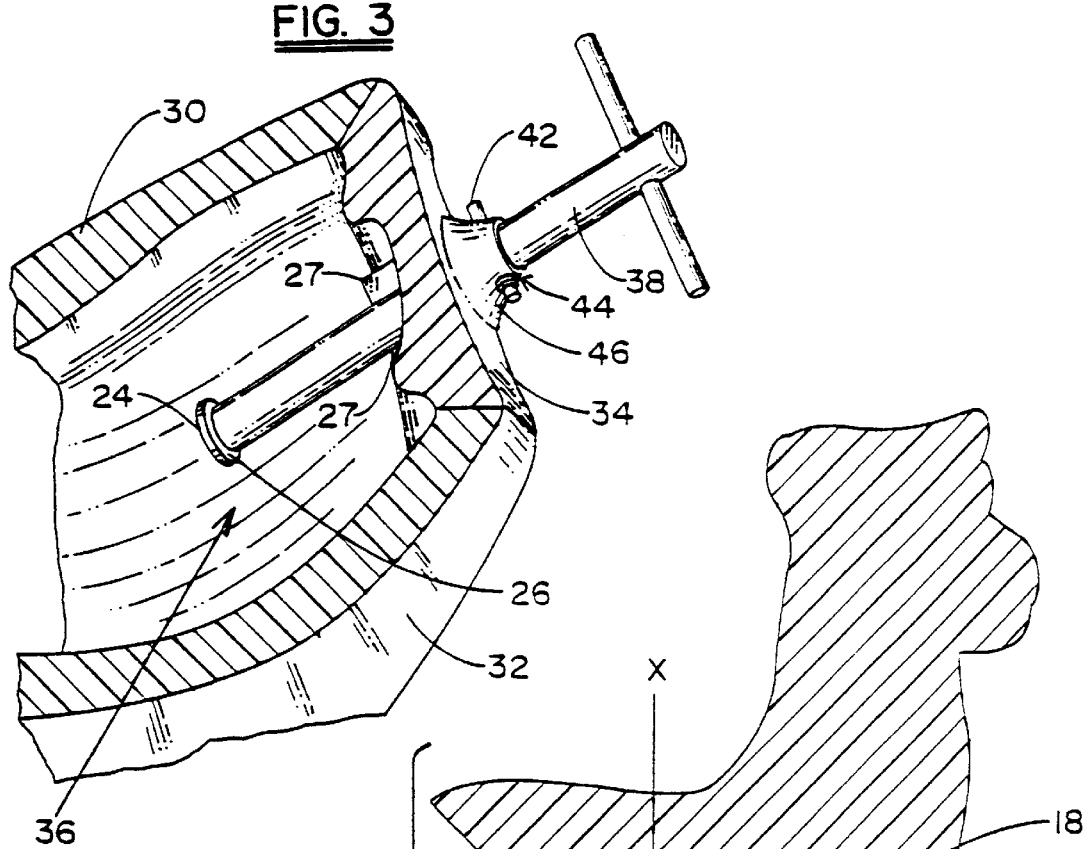
FIG. 3 is a partial, cross-sectional view of the mold assembly.
Figure 4:
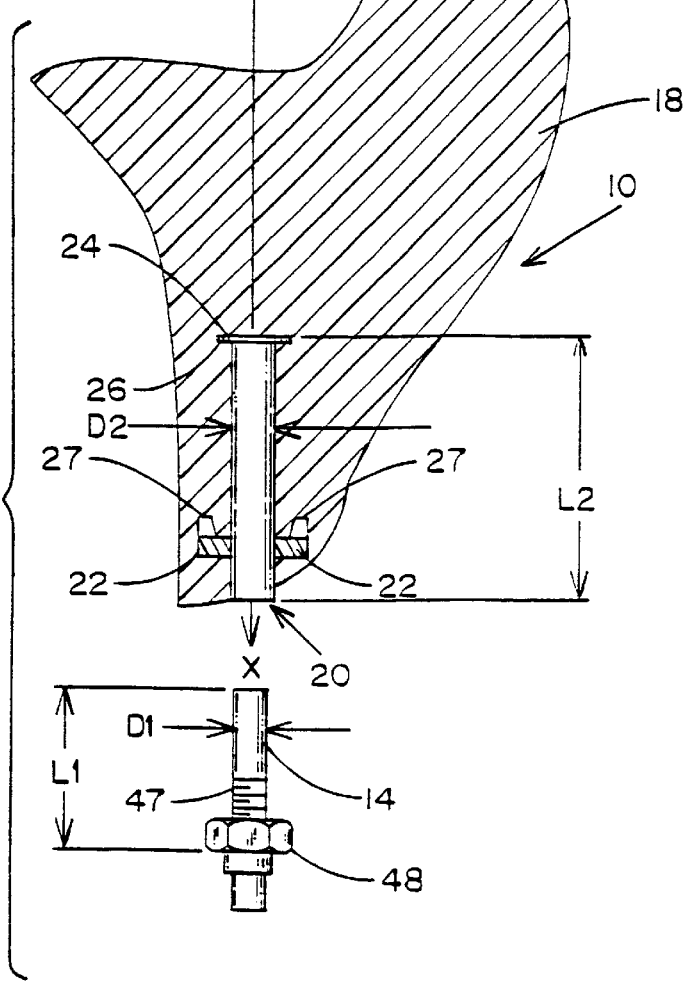
FIG. 4 is a cross-sectional view of the mannequin of FIG. 1.

Referring now to the drawings, wherein like reference numerals refer to like parts throughout, there is seen in FIG. 1 a taxidermy mannequin, designated generally by reference numeral 10, mounted atop a pedestal 12. Although the drawings show, for illustrative purposes only, mannequin 10 as being in the shape of a deer, it is to be understood that mannequin 10 could take the form of any animal, fish or object desired. In addition, pedestal 12, although shown as being pyramid shaped, could take on any shape desired, so long as it includes, or is adapted to include an elongated rod 14 extending upwardly from its upwardly facing surface 16.

Mannequin 10 includes a body portion 18 and an elongated, bored hole 20 extending therein, along a longitudinal axis X—X. Integrally molded within body portion 18 is a rigid block 22 positioned in at least partially, circumferentially surrounding relation to the sidewalls of hole 20, adjacent an exterior surface of body portion 18, and a rigid disk 24 positioned in essentially co-planar relation with the end wall 26 of hole 20. Block 22 and disk 24 provide added rigidity and stability to hole 20, and hence, mannequin 10. Block 22 includes additional reinforcing ribs 27 extending therefrom in supporting relation to the sidewalls of hole 20.

Mannequin 10 is manufactured through any traditional manufacturing method, but preferably by a process of injecting polyurethane foam into a mold, and then permitting the foam to harden at which point the mold can be broken (or separated), thereby leaving the mannequin form defined by the mold. With particular reference to FIGS. 2–3, a mold, denoted generally by reference numeral 28, comprised of three, separable mold plates 30, 32 and 34, is used to manufacture a form in the shape of mannequin 10. During the molding process, plates 30, 32 and 34 are clamped, or attached in some other conventional manner. A polyurethane foam is then injected through one of the plates and into a cavity 36 (see FIG. 3) having boundaries which define the predetermined shape of mannequin 10. After injection, the foam is permitted to harden, at which point the plates 30, 32 and 34 are separated and the mannequin removed.

In order to accurately form hole 20, prior to the hardening of the foam, an elongated rod 38 is inserted through an opening 40 formed in plate 34 (or plate 30 or 32, depending on the shape of the particular mannequin being molded), and axially (along axis X—X) into the foam for a predetermined distance. Rod 38 also passes, in contacting relation, through block 22, thereby ensuring that the block will be positioned in supporting relation to hole 20. To maintain rod 38 in a fixed position while waiting for the foam to harden, a pin 42, preferably a cotter pin, (see FIG. 3) is inserted through diametrically opposed openings 44 formed through the neck 46 which defines opening 40, and extends through rod 38, thereby fixing it in place. Rod 38 is preferably coated with some silicone based coating, or other solvent which reduces friction and/or has non-adherent qualities, so that it may be easily pulled out from within the foam and from opening 40 after the foam has hardened, thereby leaving a bored hole (such as hole 20) in the foam.

One manner of fixing disk 24 in position at endwall 26 is to have disk 24 releasably attached to the end of rod 38. Therefore, after the foam has hardened, as rod 38 is retracted out of the foam, disk 24 will detach from rod 24 due, in part, to the hardened foam surrounding it and, in part, to its releasable connection to rod 24. Alternatively, disk 24 could simply be inserted into hole 20 after its formation, and adhered to end wall 26 via glue, screws or any other connection means.

To mount mannequin 10 to pedestal 12, it is positioned thereon such that mounting rod 14 is securely positioned within hole 20. Rod 14 is of a diameter, d1, slightly smaller or about equal to the diameter, d2, of hole 20. In addition, rod 14 has an exposed length, l1, slightly longer than or about equal to the length, l2, of hole 20. Therefore, when mannequin 10 is positioned on pedestal 12, rod 14 will be securely positioned within hole 20.

In addition, due to the structural integrity of mannequin 10, it may be pivotally adjusted on rod 14 without causing damage thereto, thereby increasing the versatility of mannequin 10.

As an additional feature of the present invention, rod 14 may include a series of threads 47 adjacent its base, and a nut 48 screwed thereon. Accordingly, rod 14 may be threadingly advanced or retracted into or out of, respectively, hole 20 to any desired position.

What is claimed is:

1. A taxidermy mannequin adapted to be mounted on a pedestal having an elongated rod of a first predetermined length and diameter and having a longitudinal axis, said mannequin comprising:

a) a body portion of predetermined shape and having an exterior surface, an elongated, bored hole formed therein, sidewalls and an end wall, said bored hole being of a second predetermined length and diameter, whereby said mannequin may be positioned on said pedestal with said elongated rod extending co-axially into said bored hole;

b) a rigid block positioned within said body portion in at least partially, circumferentially surrounding relation to said bored hole; and c) a rigid disk positioned essentially co-planar with said end wall of said bored hole.

2. The mannequin according to claim 1, wherein said second predetermined length and diameter, are at most equal to said first predetermined length and diameter respectively, whereby said mannequin may be mounted for rotational movement about said longitudinal axis on said pedestal with said rod extending co-axially within said bored hole.

3. The mannequin according to claim 1, wherein said body portion is composed of polyurethane.

4. The mannequin according to claim 1, wherein said rigid disk is of a third, predetermined diameter which is larger than said second diameter.

5. The mannequin according to claim 1, wherein said rigid block is positioned adjacent said exterior surface and is concentrically aligned with said bored hole.

6. The mannequin according to claim 5, wherein said rigid block further includes at least one rib integrally extending therefrom.

7. A mold for manufacturing a taxidermy mannequin, comprising:

a) at least two plates having respective, corresponding edges positioned in releasably contacting relation to each other, and at least one of said two plates having an opening of first predetermined diameter formed therethrough, whereby when said plates are in contacting relation, a cavity of predetermined shape is defined;

b) a neck extending annulary around said opening;

c) an elongated rod of a second predetermined length and diameter;

d) means for securely positioning said elongated rod within said opening; and e) means for maintaining said at least two plates in contacting relation to one another.

8. The mannequin according to claim 7, wherein said means for securely positioning said elongated rod within said opening includes:

a) diametrically opposed openings formed through said neck;

b) an elongated opening formed radially through said rod, said opening being axially aligned with said diametrically opposed opening formed through said neck; and c) a pin releasably positioned through said opening formed through said rod and through said diametrically opposed openings.

* * * * *

UNITED STATES PATENT AND TRADEMARK OFFICE
CERTIFICATE OF CORRECTION

PATENT NO.      : 6,458,434 B1
DATED           : October 1, 2002
INVENTOR(S)     : Clyde R. Coombs, Jr.

It is certified that error appears in the above-identified patent and that said Letters Patent is hereby corrected as shown below:

<u>Column 4,</u>
Line 49, delete "mannequin" and substitute -- mold -- therefor.

Signed and Sealed this

Eleventh Day of February, 2003

JAMES E. ROGAN
*Director of the United States Patent and Trademark Office*